United States Patent [19]

Stiebel

[11] Patent Number: 5,111,020

[45] Date of Patent: May 5, 1992

[54] METHOD AND APPARATUS FOR CONTROLLING ELECTRICAL RESISTANCE SPOT WELDING

[76] Inventor: Ariel Stiebel, 88 Marlborough, Bloomfield Hills, Mich. 48013

[21] Appl. No.: 694,937

[22] Filed: May 2, 1991

[51] Int. Cl.$^5$ .............................................. B23K 11/24
[52] U.S. Cl. .................................................. 219/110
[58] Field of Search ............................. 219/109, 110

[56] References Cited

U.S. PATENT DOCUMENTS

| | | |
|---|---|---|
| 2,306,593 | 8/1939 | Collom . |
| 2,415,082 | 2/1947 | Burr . |
| 3,404,252 | 10/1968 | Michael . |
| 3,514,569 | 5/1970 | Pfaelzer et al. . |
| 3,553,420 | 1/1971 | Shearer, Jr. et al. . |
| 3,727,822 | 4/1973 | Umbaugh . |
| 4,341,940 | 7/1982 | Defourny ........................ 219/110 |
| 4,419,558 | 12/1983 | Stiebel . |
| 4,447,699 | 5/1984 | Gold et al. ..................... 219/110 |
| 4,472,620 | 9/1984 | Nied ............................... 219/110 |
| 4,959,519 | 9/1990 | Exner et al. ................... 219/110 |

FOREIGN PATENT DOCUMENTS

| | | |
|---|---|---|
| 71169 | 10/1959 | France . |
| 58-20385 | 2/1983 | Japan ................................ 219/109 |
| 460139 | 3/1975 | U.S.S.R. . |

Primary Examiner—Clifford C. Shaw
Attorney, Agent, or Firm—Gifford, Groh, Sprinkle, Patmore and Anderson

[57] ABSTRACT

Electrical resistance spot welding is controlled by stopping the welding current upon detection of indentation of the work pieces by the electrodes. Indentation is detected indirectly by monitoring the deformation in one or both electrode holders. The piston of the welding gun cylinder is prevented from displacing in direct proportion to displacements of the electrodes during formation of the weld so that the squeezing force applied by the electrodes to the work piece, and therefore the deformation in the electrode holders, varies as a function of electrode displacements.

7 Claims, 1 Drawing Sheet

METHOD AND APPARATUS FOR CONTROLLING ELECTRICAL RESISTANCE SPOT WELDING

BACKGROUND OF THE INVENTION

Field of the Invention

Stiebel, U.S. Pat. No. 4,419,558 (Dec. 6, 1983) and A. Stiebel, C. Ulmer, D. Kodrack, B. Holmes, "Monitoring and Control of Spot Weld Operations," SAE Technical Paper Series, No. 860579 (1986), Issue No. 148-7191 describe monitoring and controlling electrical resistance spot-welding by measuring displacements of the electrodes during welding. After the squeezing force is applied by the electrodes to the work pieces and the supply of welding current is initiated, the metal at the work site first expands thermally as it heats (expansion) and then flows plastically as it softens and fuses (indentation). The electrodes are displaced by the expansion and indentation of the metal at the weld site as well as by the expansion and contraction of the electrodes. Thus, measurements of the displacement of the electrodes during formation of the weld contain information indicative of the state of the metal at the weld site. It has long been known that moderate indentation almost always ensures a good weld. The ability to measure the onset of indentation makes it possible, therefore, to shut off the welding current upon detection of indentation with a high level of assurance that a good weld has been formed. The Stiebel patent and the Stiebel et al technical paper referred to above are incorporated by the foregoing reference to them into the present specification.

In the method and apparatus of the Stiebel patent (and the Stiebel et al. technical article) consistent measurements of displacement are assured by interposing a mechanical compression spring between the piston of an air cylinder (or its equivalent) that moves the movable electrode into engagement with the work piece and the movable electrode. A load cell associated with the spring detects the changes in the load imposed on the spring as the movable electrode is displaced upon expansion and indentation of the metal of the work pieces at the weld site during formation of the weld. Compressing the spring during expansion provides changes in the resulting forces in the spring and thus on the load cells that are directly proportional to the displacement of the movable electrode. Without the spring, for example with a hydraulic or pneumatic cylinder directly working on the movable electrode, the piston is theoretically free to displace with the movable electrode in direct correspondence with the electrode movements, this providing no change in load and no opportunity to detect electrode displacements by detection of load changes. In practice, friction, both static or dynamic, affect the load, and strain, on the electrode and preclude consistent monitoring of electrode displacement by detecting load changes. Moreover, in many spot-welding environments, especially in car and truck manufacturing, several welding guns are working on the work piece simultaneously and vibrations of the work piece caused by other guns effect the signals picked up by the load detector of any particular gun.

The apparatus and method of the Stiebel patent were demonstrated by thorough testing to provide reliable and consistent load signals for use in controlling the welding process. An important practical disadvantage of the Stiebel apparatus, however, is that it requires specially built welding guns—guns produced with a fixed stop, a load cell, and a mechanical compression spring. It would require huge expenditures to replace the tens of thousands of welding guns currently in use with the special guns of the Stiebel et al patent.

SUMMARY OF THE INVENTION

Recognizing the economic disadvantage of the apparatus and method of the et al patent as well as the technological importance of detecting welding electrode displacements according to the Stiebel patent (and the Stiebel et al article), the present inventor has made, in accordance with the present invention, an improvement in an apparatus and method for monitoring and controlling resistance spot welding. The electrode is moved into and out of engagement with the work pieces by a ram of a hydraulic or pneumatic cylinder which is connected to an electrode holder. Electrode displacements during formation of the weld are detected by sensing the deformation of the electrode arms, which act as springs with a very high spring constant (k). According to one aspect of the present invention, the ram of the cylinder is prevented from movement during thermal expansion of the work piece and electrodes by a directional locking device. The directional locking device permits extension of the ram during indentation of the work piece at the weld sites, but blocks the ram from movement in the opposite direction into the piston during thermal expansion. Accordingly, the squeezing force applied by the electrodes to the work piece varies as a function of expansion and indentation of the work piece as the weld is being formed. The increase in welding force during the expansion has also proven to be beneficial in as much as it helps to maintain the welding nugget and thus prevents sparking.

According to another aspect of the present invention the deformation (bending moments) in both electrode holders of the welding gun are detected by deformation sensing transducers and the signals from the transducers are added to provide a combined welding control signal. The combined signal reflects the sum of two deformation measurements and is thus stronger than a single deformation signal. Deformation due to vibrations of the holders caused by external sources rather than the welding operation tend to be cancelled out, because of the application of common mode rejection circuitry (CMR).

A further aspect of the invention is the use of a piezoelectric deformation sensing transducer mechanically affixed to the electrode holder at a location subject to maximum deformation produced by a bending moment in the holder generated by the expansion and indentation. One important advantage of this arrangement is that the invention can be readily used in existing equipment; the transducer can easily be fastened by screws or by a ring clamp to the holder. It is also advantageous to detect deformation due to a bending moment in order to provide a strong signal. The present invention is ideally suited for use on conventional welding guns, because the deformation sensing transducers can be fastened to the holder arms at locations remote from the electrodes where they are out of the way physically and subject to high deformations. The holder arms are, structurally, elastic cantilever beams with maximum bending moments near the rigid support of the arms remote from the electrodes.

DESCRIPTION OF THE DRAWING

The present invention will be more fully understood by reference to the detailed description of the preferred embodiments of the present invention when read in conjunction with the accompanying drawing, in which like reference characters refer to like parts throughout the views, and in which.

DETAILED DESCRIPTION OF A PREFERRED EMBODIMENT

Figure 1:
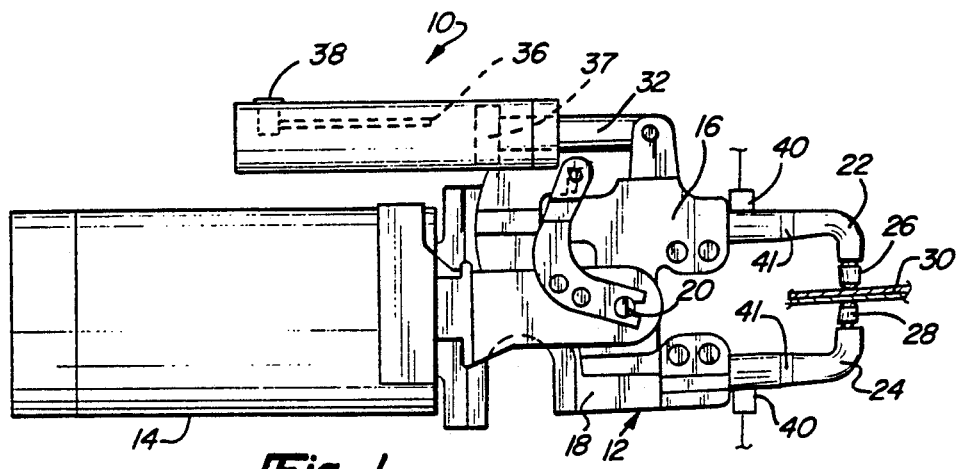
FIG. 1 is a side view of a conventional weld gun mounted to a robotic arm in accordance with the invention.

Shown in FIG. 1 is an embodiment of the invention incorporated into a robotized welding station 10 of the type widely used, for example, in car and truck production lines. The welding station utilizes a commercially available conventional welding gun 12 mounted to an arm 14 of a robot (not shown).

The welding gun 12 has an upper hand 16 and a lower hand 18 which are movable about a pivot 20. Inner ends of electrode holder arms 22 and 24 are mounted in upper hand 16 and lower hand 18, respectively. Electrodes 26 and 28 are mounted on free ends of the holder arms to engage a work piece 30 with a predetermined squeezing force. The predetermined squeezing force is applied by a ram 32 of hydraulic cylinder 34, however, other pressure applying devices such as a pneumatic cylinder may be used. The ram of the cylinder 34 is connected to the upper hand 16 to pivot the upper hand 16 and electrode holder arm 22 with respect to the pivot axis 20 to provide the squeezing force.

As is discussed more fully below, a unidirectional locking device is operable to engage and fix the ram 32 against movement into the cylinder during the heating of the work piece. The locking device may be of any suitable type such as a mechanical clamp 36 mounted within the cylinder to engage a portion of a piston 37 attached to the ram. Locking devices of this type are produced for pneumatic cylinders by Milco Co. of Warren, Michigan. For hydraulic cylinders, locking devices are available from Centerling Co. of Windsor, Ontario, Canada. The clamp is moved by solenoid switch 38 to frictionally engage the ram 32. The locking device acts to lock travel of the ram in only one direction so that the electrodes may move inwardly to form the nugget during indentation.

Mounted on each electrode holder arm 22 and 24 is a deformation sensing transducer 40. As discussed more fully below, this deformation sensing transducer advantageously is of a piezoelectric type available from Kistler, Amhearst, N.Y., and Model No. 9231. The transducer may be easily mounted by way of a single screw or ring clamp 41 to any conventional electrode holder. Advantageously as discussed below, the transducer is mounted at the point of maximum deformation which occurs when the electrode arm enters the hand of the robot.

Figure 2:
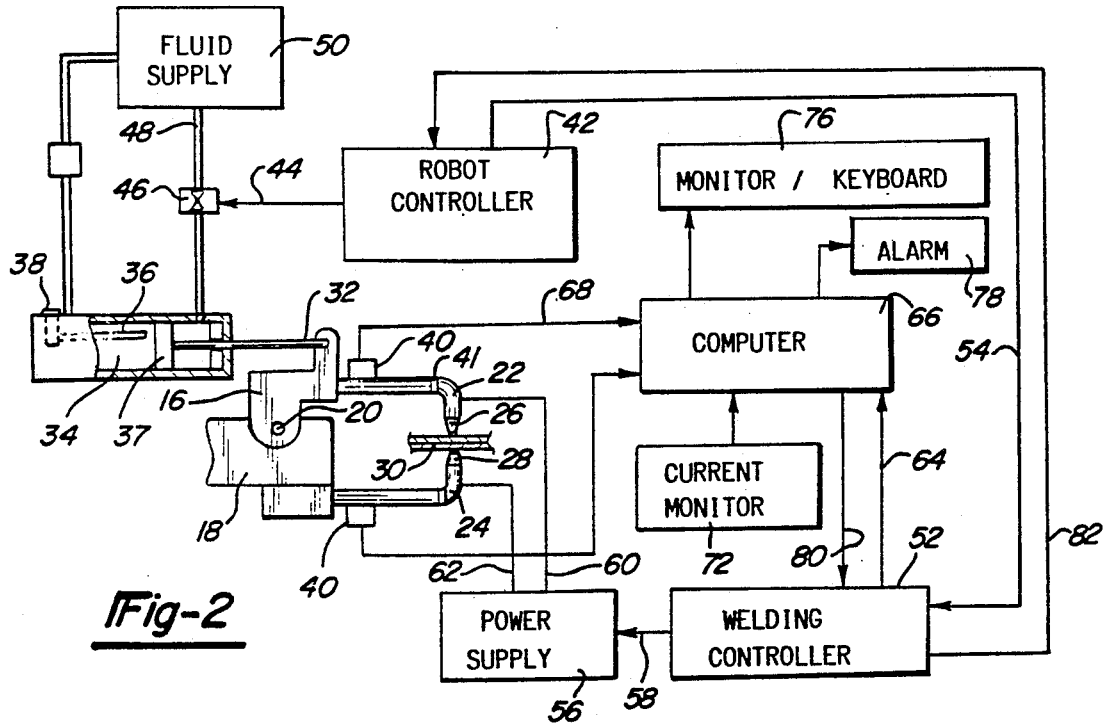
FIG. 2 is a schematic diagram of the apparatus in accordance with the invention.

A robot controller 42, as shown in FIG. 2, controls the position of the gun 12 at programmed weld sites on the work piece 30. When the gun 12 is in position at a given weld site, a signal is supplied along a signal line 44 to a control valve 46 to open the valve and allow oil under a controlled pressure to flow through a conduit 48 from a source 50 to the hydraulic cylinder 34 of the gun 12, thereby acting on the ram 32 to pivot the electrode holder arms 22 and 24 in directions about the pivot 20 to engage the welding electrodes 26 and 28 with the work piece with a predetermined squeezing force. The robot controller 42 then signals a welding controller 52 through a line 54 that a weld should be made. Thereupon, the welding controller 52 commands a power supply 56 by a signal over signal line 58 to deliver welding current pulses to the electrodes 26 and 28 through power cables 60 and 62.

Conventionally, the welding controller 52 controls the power supply 56 to deliver a set number of current pulses at a set current to the electrodes 26 and 28 based on an empirically derived control program. Based on expected electrode wear, which reduces the density of the current conduct across the work pieces the number of pulses or the level of current or both are periodically increased to ensure—it is hoped and expected—that sufficient heat is supplied at the weld site to provide good welds. For many reasons good welds are not always made, a fact that will usually become known only upon inspection of the finished welds. Also, the tendency in empirically based welding control procedures is to maintain the number of pulses and the current level high enough to maintain a very high probability that a weld is formed. As a result, there is a high incidence of sparking and expulsion, and although welds are formed, they are of inferior quality.

In accordance with the present invention, the welding process is monitored and controlled in accordance with continuous detection, during the formation of each weld, of electrode displacements due to thermal expansion and indentation of the work pieces at the weld site. The work pieces expand upon heating and are then indented by the electrodes as the weld nugget at the work site softens and deforms plastically.

After the squeezing force is applied to the work pieces 30 by the gun 12 but prior to the delivery of welding current to the electrodes 26 and 28, as described above the robot controller 42 directs the solenoid 38 of the locking device to close the clamp 36 to lockingly engage the piston 37 of the cylinder. As set fort prime importance that the hands of the gun 12 be prevented from movement away from the work piece during the heating of the work piece by the electrodes. Upon or after signalling the power supply to start welding, the welding controller 52 supplies a signal over signal line 64 to a computer 66 indicative of the fact that welding is about to begin. The transducers 40 are mounted on each holder arm 22 and 24, preferably proximate to a zone of maximum deformation due to bending of the arm in response to the squeezing force applied by the electrodes to the work piece—i.e., close to the position where the electrode holder arm enters the hands 16 and 18.

The deformation sensing transducers measure shear deformation at the surface of the member to which it is attached. The transducers provide electrical current signals indicative of load/strain that are about $3 \times 10^5$ times as sensitive as the well-known resistance wire strain gages. In addition to being amazingly sensitive, the Kistler deformation sensing transducers, being piezoelectric devices, produce current signals—without requiring a power source—and are not effected by the electromagnetic fields produced by the welding current.

Because the electrode holders of the welding guns behave, during welding, like elastic cantilever beams, any force displacement of the holders from their initial position causes a strain in the holder. This strain is directly proportional to the force which caused the displacement. Since these holders are quite rigid with a high spring constant, K, even minute movements will result in measurable deformations which are easily detected by suitable deformation sensing transducers. The signal is thus an analog of the electrode movement caused by the thermal expansion and indentation. However, in order to measure this deformation it is imperative that any back movement of the electrode holder during welding be prevented. Thus, in the case of of a conventional welding gun it is necessary to engage the unidirectional locking device to prevent back movement of the ram of the cylinder during the heating of the work piece by the electrodes.

The signals from the transducers 40 are supplied over signal lines 68 and 70 to the computer 66. A current monitor 72 supplies signals over a line 74 to the computer; these signals, of course, provide information as to the number of pulses and the magnitude of each pulse.

The computer 66 may be an analog device designed for and dedicated to the welding control system. It is well within the skill of the art to provide such an analog computer. Preferably, the computer 66 comprises a signal processor, an A-D converter and a microprocessor. The deformation signals, current signals and welding controller signals are converted to digital signals for processing in the microprocessor. Associated with the computer 66 are a monitor/keyboard 76 and an alarm 78, which may be visual or audible or both and which signals a bad weld.

The device will operate with a single deformation sensing transducer mounted to one of the electrode holders. However, It has been found particularly advantageous to utilize a transducer mounted on each electrode holder. Adding the signals of both transducers will result in a signal having almost double the amplitude than that of a single transducer signal. This will result in increased sensitivity and the use of common mode rejection (CMR). In mechanical terms, the thermal expansion forces of the holders will produce signals from the pair of transducers which will be additive. However, if the holders are subjected to external forces, such as vibration, the transducer signals from the pair of transducers will cancel each other out. Thus, a high degree of CMR will result in reliable movement signals and produce meaningful information for the welding control computer.

Figure 5:
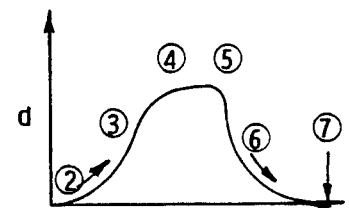
FIG. 5 is a diagram showing the displacement of an electrode over time during the welding process.

The combined signal is filtered and differentiated to produce a signal indicative of the ds/dt in the velocity of movement of the electrodes. As shown in FIG. 5, the characteristic curve of strain during the welding process consists of; a portion in which the electrodes (point 2) move apart as the metal of the weld site thermally expands, a portion in which the electrodes (points 3 to 4) slow and then stop as the nugget softens, and a portion in which the electrodes move back toward each other (points 4 to 7) and form an indentation as the nugget is plastically deformed.

Figure 3:
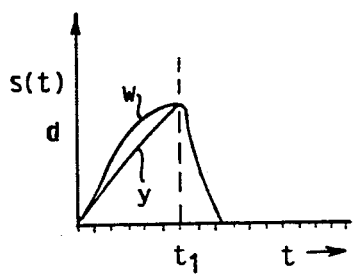
FIG. 3 is a diagram showing expansion of a work piece over time in accordance with a timed method of the prior art.
Figure 4:
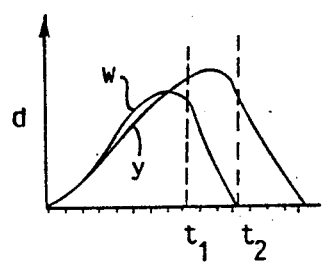
FIG. 4 is a diagram showing distance of expansion of a work piece over time controlled in accordance with the present invention.

Contrary to past practices, it has been found that attainment of maximum point (point 4) in the outward travel of electrodes is not always a sufficient indication for a fully developed nugget. It is quite possible that a certain maximal thermal expansion has been reached, but because of excessive heat losses the necessary temperature for welding conditions in the specified time was not obtained. In this particular case, reversal electrode movement and indentation would not have taken place, indicating that a doubtful spot weld was produced. Thus, it has been found advantageous to determine the onset of indentation, as set forth above, to determine when the welding current should be turned off. The graphs of FIGS. 3 and 4 show the basic difference between the regular and controlled spot welding method based on the above-mentioned criteria. In FIG. 3, the expansion curve W of a typical weld is shown. The current is cut off at a fixed time and under normal conditions produces an acceptable weld. With the change in conditions, such as electrode mushrooming, expansion curve Y was obtained. In both cases the flow was terminated at 6 cycles. However, as shown in FIG. 4, the controlled method results in the termination of current at $T_1$ for expansion curve W and $T_2$ for expansion curve Y, thereby resulting in consistent good spot welds, as discussed in the above-mentioned SAE paper.

It has been found that the welding current should be turned off early in the period of indentation, lest sparking and expulsion occur.

The derivative of the strain curve shows sequentially a period of acceleration of the electrodes, a period of deceleration and a period of no change in electrode speed. The digital signal of the acceleration consists of YES, there is acceleration—positive or negative—, and NO, there is no acceleration.

Based on inputs of the current signals and electrode acceleration signals, the computer 66 controls the welding controller 52 by directing it through a control signal passed along line 80 to stop the supply of current when the acceleration signal indicates no electrode movement. Alternatively, the computer can be programmed to keep the current on for one or two current pulses after the electrode stops. Also, the computer can be programmed to stop the welding current at a set number of current pulses if the electrode acceleration has not yet stopped, which is indicative of no softening or indentation and thus no weld. The program can keep track of the number of welds and the numbers of current pulses for those welds, and when a selected number of welds are observed that have required an empirically determined, relatively high number of current pulses, the computer may signal the welding controller to increase the welding current. There are numerous other opportunities for controlling the welding process based on detection of welding electrode displacements and welding current and for signalling defects or deficiencies in the performance of the equipment in accordance with the present invention.

Upon completion of a weld, the welding controller 52 provides over signal line 82, a notice to the robot controller 42 that the weld has been completed. After a programmed hold time, the robot controller 42 instructs the control valve 46 and solenoid 38 to open, thereby venting the cylinder 34 and releasing the clamp 36 to retract the electrodes. This is the end of a cycle, and the robot controller directs the robot to the next weld site for repetition of the process described above.

An important aspect of the invention is the unidirectional locking of the ram 36 of the cylinder 34 of the welding gun or otherwise keeping the cylinder ram 32 from displacing in direct correspondence to displacements of the electrodes as the weld is being formed. Such corresponding displacements of the piston and electrodes would mean no change in the load/deformation in the electrode holder arms 22 and 24 and hence no detection of electrode displacements.

Other ways of preventing movements of the piston directly corresponding to movements of the electrodes (i.e., no load/deformation changes) are mechanical or pneumatic brakes or locks, and it is within the scope of the invention to employ such a means.

I claim:

1. An electrical resistance spot welding apparatus that includes a welding gun having a pair of electrode holders, each electrode holder supporting an electrode, and having means for moving said electrode holders to move said electrodes into and out of squeezing engagement with a work piece, said apparatus comprising:

a controllable source of electrical welding current coupled to said electrodes;

means for continuously detecting the mechanical deformation in a work piece, said means for detecting further comprising a piezoelectric transducer mounted to at least one of said electrode holders, said piezoelectric transducer producing a continuous electrical signal indicative of said deformation;

means for terminating said welding current, said means for terminating continuously receiving and monitoring said electrical signal from said piezoelectric transducer to immediately terminate the welding current when said electrical signal indicates the occurrence of indentation of the weld nugget; and means for unidirectionally locking said means for moving said electrode holders during thermal expansion and indentation of the work pieces at the weld sites during formation of the weld said means for locking mechanically connected to at lest one of said electrode holders to prevent said electrodes to move apart during said deformation.

2. The apparatus according to claim 1, wherein said means for continuously detecting the mechanical deformation comprises a piezoelectric transducer mounted to each electrode holder, said transducer producing a signal indicative of the deformation in the corresponding electrode holder and wherein said means for controlling is responsive to the sum of the signals.

3. The apparatus according to claim 1, wherein said piezoelectric transducer is affixed to each of said electrode holders at a location subject to deformation produced by a bending movement in said electrode holder generated by the expansion and contraction of the work piece and electrodes during the welding process.

4. The apparatus of claim 3, wherein said means for moving further comprises a pair of hands, each of said pair of hands having one of said pair of electrode holders mounted therein, each said transducer being mounted to said electrode holder adjacent to the respective one of said pair of hands.

5. The apparatus of claim 1, wherein said means for moving said electrode holders comprises a cylinder and ram and wherein said means for locking is mounted within said cylinder.

6. An electrical resistance spot-welding method in which electrode holders of a welding gun are acted upon by a means for moving said electrode holders to apply a squeezing force to a work piece while electrical current is conducted between the electrodes through said work piece at a welding site, the method comprising the steps of:

locking said electrode holders mechanically from movement apart during thermal expansion of the work piece at the weld site during the formation of the weld;

measuring continuously the mechanical deformation in at least one of the electrode holders with a piezoelectric transducer;

generating a continuous electrical signal indicative thereof; and stopping the supply of welding current to the electrodes when the signal indicates the occurrence of indentation.

7. The method according to claim 6 further comprising the step of detecting the deformation in both electrodes and generating a signal in response to each deformation and stopping the supply of welding current to the electrodes in response to the sum of the signals.

* * * * *

UNITED STATES PATENT AND TRADEMARK OFFICE
CERTIFICATE OF CORRECTION

PATENT NO. : 5,111,020
DATED : May 5, 1992
INVENTOR(S) : Ariel Stiebel

It is certified that error appears in the above-identified patent and that said Letters Patent is hereby corrected as shown below:

Column 2, line 9, after "the" (first occurrence), insert --Stiebel--.

Column 4, line 52, at beginning of line, delete "fort" and insert --forth below, it is of--.

Column 7, Claim 1, line 45, delete "lest" and insert --least--.

Signed and Sealed this

Thirty-first Day of August, 1993

Attest:

BRUCE LEHMAN

*Attesting Officer*   *Commissioner of Patents and Trademarks*